United States Patent [19]

Moore

[11] Patent Number: 4,781,749

[45] Date of Patent: Nov. 1, 1988

[54] POLYMETHYLENE UREA FERTILIZER SOLUTION

[75] Inventor: William P. Moore, Hopewell, Va.

[73] Assignee: Coron Corporation, Souderton, Pa.

[21] Appl. No.: 103,039

[22] Filed: Sep. 29, 1987

[51] Int. Cl.$^4$ ................................................ C05C 9/00
[52] U.S. Cl. ........................................ 71/28; 71/27; 71/29; 71/30
[58] Field of Search ................................ 71/27, 28–30

[56] References Cited

U.S. PATENT DOCUMENTS

| | | |
|---|---|---|
| 31,801 | 1/1885 | Moore . |
| 2,467,212 | 4/1949 | Kvalnes . |
| 3,462,256 | 8/1969 | Justice et al. . |
| 4,244,727 | 1/1981 | Moore, Jr. . |
| 4,304,588 | 12/1981 | Moore . |
| 4,409,015 | 10/1983 | Grace . |
| 4,544,005 | 11/1985 | Hawkins . |
| 4,579,580 | 4/1986 | Moore ................................ 71/28 |

*Primary Examiner*—Ferris H. Lander

[57] ABSTRACT

A two stage method for preparing clear, storage stable, controlled release polymethylene urea nitrogen fertilizer solution. In the first stage, urea is reacted with a molar excess of formaldehyde, with temperatures of 75° to 100° C., at near-neutral pHs provided by buffers such as sodium bicarbonate, in the presence of ammonium compounds, until the formaldehyde is substantially converted to methylene moeities. In the second stage, the methylene moeities are reacted with additional urea and ammonium compounds, with temperatures of 75° to 100° C., in a near-neutral buffered solution at a pH of between 6.9 and 8.5, until the added urea is substantially converted to water soluble branched chain polymethylene ureas. Optimum urea to formaldehyde mol ratio in the first stage is between 0.483 and 0.518 to 1 and in the second stage optimum ratio is between 1.3 and 1.5 mols urea per mol of formaldehyde. The polymethylene ureas comprise a number of water soluble chemical compounds containing 2 to 4 methylene moeities, 2 to 5 urea moeities and 0 to 2 ammonia moeities including the different structural isomers for several of the same empirical formulae. The product formed by the two stage process contains little methylolurea and methylene diurea which are associated with reduced storage stability. Because of the two step process which provides low urea, ammonia and methylolurea concentrations, the product exhibits controlled nitrogen nutrient release to plants.

19 Claims, No Drawings

POLYMETHYLENE UREA FERTILIZER SOLUTION

BACKGROUND OF THE INVENTION

1. Field of the Invention

This invention relates to nitrogen fertilizer solutions produced from urea and formaldehyde. More particularly it relates to a method for producing storage stable, controlled release, nitrogen solution fertilizers by a two stage process, and the product derived from that method.

2. Description of the Prior Art

Urea formaldehyde condensation polymers have been used for many years to provide fertilizers which release nitrogen at rates to adequately feed growing plants without damaging either the foliage or root systems of the plants. Urea formaldehyde solid fertilizers have been widely used but are difficult to apply evenly and release their nitrogen contents in an incomplete and sometimes unpredictable manner.

It is well known that the reaction of urea with a molar excess of formaldehyde for moderate periods of time in the presence of bases produces methylolureas at ambient or moderate temperatures. This reaction is the basis for the production of urea formaldehyde concentrates, such as "UFC-85" widely marketed today and patented by H. M. Kvalnes in U.S. Pat. Nos. 2,467,212 (1949); reissue U.S. Pat. No. Re. 23,174 (1949).

The art contains numerous efforts to produce urea formaldehyde based liquid fertilizer products which are easy to store and apply evenly. The recent prior art contains several disclosures of urea formaldehyde based clear aqueous solutions, and aqueous liquid dispersions of insoluble urea formaldehyde polymers.

G. H. Justice et al in U.S. Pat. No. 3,462,256 disclosed a process for producing urea formaldehyde concentrates which are storage stable for 20-25 days at 25° C. and 7 days at 0° C. Justice prepares urea formaldehyde solutions by reacting an aqueous solution of urea (U) and formaldehyde (F) in a 1 to 2:1 U:F mol ratio with 0.3 to 6.0 percent ammonia at a strong alkali-induced pH of 8.5 to 10.0 and 75° to 100° C. until at least 90 percent of the formaldehyde is reacted with at least 60 percent of it in the form of methylolurea. Alkali addition is then terminated and heating is continued until at least 50 percent of the formaldehyde is converted to methylene urea, as determined by the difference between total formaldehyde and free formaldehyde plus methylolurea. Unfortunately, the product of the Justice process contains as much as 40 percent of the formaldehyde moieties as methylolurea, and this continues to react with the methylene urea to form water insoluble precipitates so that the storage life must be limited to a month or less at ambient temperatures and a week under freezing temperature.

E. F. Hawkins in U.S. Pat. No. 4,544,005 discloses a controlled release nitrogen solution described as a triazone solution containing about 30 parts triazone, 40 parts urea, up to 3 parts methylene diurea, up to 6 parts monomethylolurea and hexamethylenetetramine, wherein the triazones amount to an 80/20 mixture of S-tetrahydrotriazone and N-hydroxymethyl formamide triazone. Hawkins provides a two stage process for heating aqueous urea and formaldehyde in a 1 to 2:1 mol ratio at 85° to 90° C. at a strong caustic induced pH of 8.5 to 9.2 in the presence of 0.20 to 0.38 mols of ammonia per mol of formaldehyde for a period of 25 to 60 minutes and then maintaining the temperature and terminating the addition of strong caustic for a period of 30 to 60 minutes. The relatively high urea concentration required in the Hawkins product increases the phytotoxicity of any fertilizer solutions produced, and decreases the value of that portion of the nitrogen that is protected.

W. P. Moore in U.S. Pat. No. 4,244,727 reissue U.S. Pat. No. Re. 31,801 teaches a process for reacting aqueous urea and formaldehyde at a U:F mol ratio of 1.5 to 2.0:1 at 75° to 90° C. while maintaining pH between 8.5 and 9.8 in the presence of alkali to produce a storage stable fertilizer solution comprising methylolurea. Aqueous methylolurea exhibits lower phytotoxicity toward plants than free urea, and is storage stable in base solutions for long periods of time but releases its nitrogen more rapidly than methylene ureas.

In U.S. Pat. No. 4,304,588, W. P. Moore discloses a process for preparing storage stable aqueous concentrates of nitrogenous foliar feeds comprising monomethylolurea with monomethylene diurea concentration limited to 5 percent. The process consists of reacting aqueous urea and formaldehyde in the presence of an alkali metal carbonate and hexamethylene tetramine at 85° to 95° C. with a U:F mol ratio between 1.4 and 1.9, with at least 50 percent of the formaldehyde reacted to form methylolurea. A pH of 8.5 to 10.5 is prescribed for the reaction and the product.

T. T. Grace in U.S. Pat. No. 4,409,015 discloses a two stage process for preparing water insoluble ureaform solids dispersed in aqueous urea and soluble ureaform compounds. Grace teaches preparation of a preresin by heating a high formaldehyde to urea molar mixture in the presence of acid until a desired level of polymerization is reached, as indicated by methanol insolubility and viscosity measurements. More urea is then added, and acid and further polymerization is then carried out at lower temperatures until the desired amount of water insoluble polymers are formed. Although the desirable slower release of methylene ureas is obtained, settling of the water insoluble solids during storage and clogging of spray nozzles by the solids during applications can create serious problems in field operations.

Although much progress in the area of urea formaldehyde liquid fertilizers has been made in the prior art, no disclosure has been made of a simple and easily controlled, two stage method for the preparation of a storage stable clear controlled release nitrogen fertilizer solution comprising polymethylene ureas.

It is a primary object of this invention to provide a readily controlled method for preparing a storage stable, controlled release, polymethylene urea nitrogen fertilizer solution from urea and formaldehyde.

It is another object of this invention to provide a storage stable controlled release polymethylene urea nitrogen fertilizer solution containing less than 40 percent of its nitrogen in the form of urea, and less than 6 percent of its nitrogen as methylene diurea.

SUMMARY OF THE INVENTION

I have discovered a new two stage method for preparing clear, storage stable, controlled release polymethylene urea nitrogen fertilizer solution. In the first stage, urea is reacted with a molar excess of aqueous formaldehyde, at near-boiling temperatures in the presence of buffering agents to maintain near-neutral reaction conditions and stabilizing ammonium compounds, until the formaldehyde moeities are substantially converted to methylene moeities. In the second stage the methylene moeities are reacted with sufficient added urea to provide a molar excess of urea to formaldehyde, at near-boiling temperatures, in the presence of buffering agents to maintain near-neutral reaction conditions, and stabilizing ammonium, until the added area is substantially converted to water soluble branched chain polymethylene ureas.

The polymethylene urea nitrogen fertilizer solution prepared by this method was found to contain surprisingly low concentrations of methylolurea, and urea, while exhibiting outstanding storage stability at high, low, and ambient temperatures at about constant near-neutral pH.

This invention provides for the first time a clear, controlled releasing nitrogen solution containing polymethylene urea with only traces of methylolurea and low concentrations of urea, which is storage stable for long periods of time at near neutral pH.

DESCRIPTION OF THE INVENTION

The clear, controlled release nitrogen solution containing polymethylene urea nitrogen solution of this invention must be made by a two stage method. In the first stage urea is reacted at near boiling temperatures with a molar excess of formaldehyde to substantially convert the formaldehyde to methylene moeities. If a molar excess of formaldehyde over the urea is not used in the first stage methylene moeities are not substantially formed and the final fertilizer solution produced by reaction with additional urea has undesirably high urea and methylolurea concentrations which can cause foliage burn when applied to plants. Effective products are prepared with mol ratios of formaldehyde (F) to urea (U) in the first reaction stage between 1.5 and 2.5 to 1, and best product storage stabilities with minimum free urea and methylolurea contents are obtained with F:U mol ratios between 1.93 and 2.10.

The first stage is carried out at "near-boiling temperatures" which herein means temperatures between about 75° and 105° C. Lower temperatures allow the formation with retention of undesirably high concentrations of methylolurea and higher temperatures undesirably favor the formation of long chain water insoluble polymers and detracts from the storage stability of the product. Optimum results are obtained at reaction temperatures between 80° and 90° C., producing almost exclusively methylene linkages from the formaldehyde linkages.

In the first stage reaction to react urea to substantially convert formaldehyde to methylene moeities it is also required that buffering agents be present to maintain near-neutral reaction conditions. The term "near-neutral pH" is used herein to mean pH's between 6.9 and 8.5. The buffering agents found to provide the pH control necessary for substantially converting formaldehyde to methylene groups or moeities include sodium bicarbonate, potassium bicarbonate, sodium formate, potassium formate, potassium acetate, and sodium acetate. Stronger bases such as alkali hydroxides, alkali carbonates, and basic oxides were unsatisfactory buffers, producing primarily methylolureas from urea and formaldehyde instead of the desired methylene compounds. Because of economics and optimum pH control, sodium bicarbonate is the preferred buffering agent. Concentrations of the buffering agents found necessary in the first reaction stage were between 0.003 and 0.03 mols buffering agent per mol of formaldehyde, with best results obtained using between 0.003 and 0.006 mols sodium bicarbonate per mol of fresh formaldehyde containing little or no formic acid.

It is necessary to employ ammonium compounds in the first stage conversion of formaldehyde to methylene moeities to act as a "chain stopper" and prevent the polymerization of the methylene moeities to form long chain water insoluble polymers. "Chain stopper" is used herein to denote a material which reacts to deactivate end groups on a molecule, or polymer chain, to prevent its further reaction or polymerization. The ammonium compounds are chemically reacted leaving no free ammonium compounds in the product. The exact nature of this chemical reaction is not certain, but it is postulated that trimethylene triamine is formed as an intermediate which subsequently reacts with urea to form a mixture of water soluble branched chain compounds. The amount of ammonium compound required in the first stage was found to be rather small, amounting to between 0.03 and 0.10 mol per mol of formaldehyde with best results obtained with between 0.05 and 0.08 mols ammonium hydroxide per mol of formaldehyde. Other ammonium compounds effective as chain stoppers in the first reaction stage are ammonium bicarbonate, ammonium carbonate, ammonium formate, ammonium acetate, and ammonia.

The first stage reaction must be continued until the formaldehyde is substantially converted to methylene moeities so that a storage stable final fertilizer can be produced. "Substantially converted" is used herein to mean conversion of more than 50 percent of the formaldehyde charged to methylene moeities. The method of this invention is effective when the conversion of formaldehyde is carried out so that the amount of methylolurea produced in that conversion is limited to between 0 and 10 percent of the formaldehyde moeities. The first stage reaction is preferably continued until between 60 and 80 percent of the formaldehyde is converted to methylene moeities, and methylolurea conversion amounts to between 2 and 6 percent, leaving between 0 and 10 percent of the formaldehyde moeities as free formaldehyde.

"Free formaldehyde" herein means formaldehyde as determined by the standard bisulfite chemical analyses. "Methylene moeities" herein means the $-CH_2-$ groups derived from the dehydration or chemical reaction of formaldehyde.

The methylene moeities can be determined as the difference between total formaldehyde moeities and the sum of free formaldehyde and methylolurea moeities. The methylolurea and formaldehyde analyses may be effectively determined by high pressure liquid chromatography (HPLC). The methylene moeities may be determined quantitatively by adding the individual HPLC peaks of compounds containing the methylene moeities. The limited accuracy of determining the molecular weights of the individual peaks makes the peak summation method less accurate than the difference method for methylene moeities. Methylene diurea is readily determined by HPLC and is clearly and accurately differentiated from the polymethylene urea compounds. Polymethylene ureas may be determined by the difference between total methylene ureas and methylene diurea.

"Polymethylene ureas" herein mean water soluble methylene urea compounds which comprise 2 to 4 methylene moeities, 2 to 5 urea moeities, and 0 to 2 ammonia moeities. There are a surprisingly large number of individual compounds described by this definition. Differences in the individual compounds are caused by different molecular weights, different amounts of ammonia compound in the molecules, and different spatial isomers of the same empirical formula.

Chemical compounds which contain methylene moeities as defined herein include all of the isomers of dimethylene triurea, trimethylene tetraurea, and tetramethylene pentaurea and their ammonia reaction products. Also included in the methylene moeities is trimethylene triamine. These methylene moeities, their precursors, and others are produced in the first stage reaction as a mixture of soluble chemical compounds.

In the second stage these methylene moeities are reacted with sufficient added urea to provide a urea to formaldehyde molar ratio between 1.0 and 1.7 to 1 at near-boiling temperatures. More effective U:F ratios were found to be between 1.2 and 1.6 to 1.0, with lower ratios producing low free urea contents but not having optimum storage stability, and higher ratios producing higher than desired free urea contents. Preferred U:F ratios were between 1.3 and 1.5 to 1.0. The high free ureas cause foliage burn when the product is used as a liquid fertilizer. The process is operable at the near-boiling temperatures between 75° and 105° C., and the best storage stability with low burn product characteristics was obtained with the second stage reaction temperatures between 85° and 95° C.

The second stage requires additional buffering agents to maintain the near-neutral reaction conditions at pHs between 6.9 and 8.5. As in the first stage effective buffering agents were sodium bicarbonate, potassium bicarbonate, sodium formate, potassium formate, sodium acetate and potassium acetate. The amount of buffering agent required in the second stage reaction was between 0.03 and 0.30 mol per mol of formaldehyde. Preferably, the buffering agent in the second stage was sodium bicarbonate amounting to between 0.04 and 0.06 mols per mol of formaldehyde.

Although a higher concentration of buffering agent is required in the second stage than in the first, it is permissible to add all of the required buffering agents in the first stage reaction and allow the excess buffer to carry over into the second stage reaction. This is allowable because the preferred buffering agents provided in the present invention do not maintain pH outside the desired operating zone regardless of their concentrations.

It is not possible to add all of the ammonium compounds in the first stage reaction and allow them to carry through into the second stage. Use of ammonium compound concentrations above 0.10 mol per mol of formaldehyde in the first stage reaction strongly inhibits the substantial conversion of formaldehyde to methylene moeities required in the method of this invention.

It was necessary to use higher concentrations of ammonium compounds in the second stage reaction than in the first stage to prevent linear polymerization of the urea with the methylene moeities and the production of water insoluble solids. The second stage operated satisfactorily with between 0.20 and 0.35 mol ammonium compound in the reaction mixture per mol of formaldehyde, and preferably with a mol ratio between 0.25 and 0.30 mols ammonium hydroxide per mol of formaldehyde.

It was found that ammonium bicarbonate, ammonium carbonate, ammonium hydroxide, ammonium formate, ammonium acetate, and ammonia were the most effective ammonium compounds. These compounds were effective because they provided the chain stopping ammonium group without appreciably affecting the buffered reaction pH.

To produce a nitrogen fertilizer solution with controlled release nitrogen it is necessary that the second stage reaction be continued until the added urea and ammonia are substantially converted to water soluble polymethylene ureas, with the minor amount of between 0.0 and 0.04 mols of methylolurea per mol of formaldehyde in the product. In the preferred method, the second stage reaction is continued until the methylene moeities formed in the first stage are reacted substantially to form water soluble polymethylene ureas in a liquid product containing minor amounts of between 0.0 and 0.02 mols of methylolurea and between 0.03 and 0.10 mol of methylene diurea per mol of formaldehyde used to produce the solution.

I have found that the polymethylene urea nitrogen fertilizer solution composition prepared by the two stage method defined herein gave storage stability test results which indicated that the composition could be stored for more than 6 months at ambient temperatures of 20°–25° C. and more than 2 months at 0° C., and that the composition could be safely used as a controlled release fertilizer when applied to either the soil or plant foliage.

I have also found that the polymethylene urea nitrogen fertilizer solution prepared by the two stage method of this invention using the preferred and optimum conditions defined herein gave storage stability test results which indicate that the composition could be stored for more than 1 year at ambient temperatures of 20°–25° C. and more than 6 months at 0° C. The optimumly prepared composition could be used directly on most plant foliage at reasonable nitrogen concentrations and application rates without causing leaf damage or chlorosis. The optimumly produced product released nitrogen in a controlled manner when applied as a liquid fertilizer in the soil.

MODE OF OPERATION OF INVENTION

Having described the basic concepts of the instant invention, reference is now made to the following examples which are provided to illustrate the preferred method of preparing the polymethylene urea fertilizer solution, the composition of the solution, and comparative evaluations with the prior art.

Example 1

To a 2-liter laboratory glass reactor jacketed for heating and cooling, and equipped for agitation, pH measurement, refluxing, evaporation and venting were added in the order listed, the first stage reactants listed as follows:

| 1st Stage Reactants | grams | mols | mol ratio |
|---|---|---|---|
| Aqueous Formaldehyde, 50% HCHO | 787.4 | 13.123 | 1.000 |
| Sodium Bicarbonate, $NaHCO_3$ | 2.8 | 0.033 | 0.003 |
| Urea, 46% N prills | 374.3 | 6.238 | 0.475 |
| Aqua Ammonia, 30% $NH_3$ | 39.2 | 0.692 | 0.052 |
| Total | 1203.7 | | |

The first stage reactants were heated to 85° C. with cooling applied to maintain about that temperature while the strongly exothermic reaction between formaldehyde, urea, and ammonia occurred. The pH remained at about 8.2 throughout the first stage reaction. The reaction was continued until free formaldehyde and methylolurea contents amounted to 5 and 6 percent of the formaldehyde charged. This was achieved after 30 minutes reaction time at 85° to 88° C.

As soon as the first stage reaction was completed the second stage reactants were added expeditiously with continued agitation in the order listed as follows:

| 2nd Stage Reactants | grams | mols | mol ratio |
|---|---|---|---|
| Urea, 46% N prills | 736.1 | 12.268 | 0.935 |
| Sodium Bicarbonate, NaHCO3 | 46.8 | 0.557 | 0.042 |
| Aqua Ammonia, 30% NH3 | 100.1 | 2.825 | 0.215 |
| Total | 943.0 | | |

The first two stage reactants when combined gave the total reactants listed as follows:

| Total Reactants | grams | mols | mol ratio |
|---|---|---|---|
| Formaldehyde, 50% HCHO | 787.4 | 13.123 | 1.000 |
| Urea, 46% N prills | 1110.4 | 18.506 | 1.410 |
| Sodium Bicarbonate, NaHCO3 | 49.6 | 0.590 | 0.045 |
| Aqua Ammonia, 30% NH3 | 199.3 | 3.517 | 0.268 |

Strong heating was required to overcome the endothermic heat of solution when the urea was added to the mixture. Temperature was increased to 90° C. and the reaction was continued until the methylene moeities produced in the first stage reaction were substantially reacted to produce polymethylene ureas in the liquid product which contained no free formaldehyde, and total conversions of the charged formaldehyde to methylene diurea, and methylolurea were 4 and 2 percent respectively. The second stage reaction required 60 minutes at 90° C. to achieve the desired conversion to polymethylene urea. During the second stage reaction the pH remained between 8.8 and 8.2, with small amounts of carbon dioxide forming throughout the second stage reaction as the sodium bicarbonate buffered acid formed during the reaction.

When the second stage reaction was completed a vacuum was applied to the mixture and 140 grams of water was evaporated to concentrate the 2002 grams of product cooled and recovered at pH 8.0 for analysis.

Analyses were made of the recovered liquid product and the results are listed as weight percent of the product solution, and as weight percent of the total nitrogen content, as follows:

| Component | Wt % | Wt % of N |
|---|---|---|
| Total nitrogen, N | 28.0 | 100.0 |
| Ammonia, NH3 | 0.0 | 0.0 |
| Methylolurea | 1.2 | 1.3 |
| Methylene diurea | 3.0 | 4.9 |
| Polymethylene urea | 44.5 | 64.2 |
| Urea | 18.1 | 29.7 |

Example 2

A 50 gram sample of the product from Example 1 was placed in a capped glass bottle and set in a controlled temperature water bath operating at a temperature of 59° C. The sample was allowed to remain at that temperature for 30 days and was then withdrawn and inspected. Viscosity of the product was 37 centipoise at 25° C. as measured by Brookfield Viscosimeter initially and 40 centipoise at the end of the heating period. The polymethylene urea solution was colorless and clear initially and at the end of the test period. This 30 day heating test is used in the liquid urea formaldehyde solution industry to simulate 12 months storage at ambient temperatures of 20° to 25° C. The test results indicate that the product of Example 1 is storage stable for more than one year without polymerization or solids formation.

Example 3

Another 50 gram sample of the product from Example 1 in a capped glass bottle was placed in dry ice and cooled to −20° C. where the solution became very viscous but did not precipitate. The sample was maintained at about −20° C. for 6 hours and then warmed to 60° C. and held at that temperature overnight. The product was carried through 19 cycles of cooling to −20° C. and heating to 60° C. At the end of the test period the sample retained its original clear, colorless appearance and contained no precipitated solids. The product never froze during the cooling cycles but continued to be very viscous when cold. At the end of the 16 cycles, the viscosity at 25° C. was 38 centipoise. Each 3 cooling and heating cycles has been used to simulate one months storage at 0° C. The test results indicate the product of Example 1 has a storage stability at 0° C. of more than 6 months.

Example 4

A comparative test was carried out comparing the controlled nitrogen release properties of the product of Example 1 with urea using three plots 3′×5′ for each nitrogen product. The plots contained well established bluegrass turf cut on a near-weekly basis to a height of 1.5 inches.

The product from Example 1 and urea were each diluted to 5 percent nitrogen concentration in water with no additional materials added. The Example 1 product and urea solutions were each applied to three plots on a clear day at 28° C. at rates of 1.5 pounds of nitrogen per 100 square feet of turf.

Five days after the application of the two nitrogen sources the plots were again inspected and all plots were found to have grown. The three plots treated with the urea solution were found to contain tip burn or chlorosis on almost all of the grass blades, while the three plots treated with the product of Example 1 were uniformly green with no tip burn or chlorosis. The lack of foliar damage at a substantial application rate of nitrogen indicates that the nitrogen in the product of Example 1 exhibited controlled release.

I claim:

1. A two stage method for preparing clear, storage stable, controlled release polymethylene urea fertilizer solution, comprising:
 (a) a first stage reaction of urea with a molar excess of aqueous formaldehyde, amounting to between 1.5 and 2.5 mols formaldehyde per mol of urea, at near-boiling temperatures between 75° and 105° C. in the presence of buffering agents to maintain near-neutral reaction conditions, and ammonium compounds, until the formaldehyde is substantially converted to methylene moeities; and
 (b) a second stage reaction of the methylene moeities with sufficient added urea to provide a molar excess of urea to formaldehyde at near-boiling temperatures in the presence of buffering agents sufficient to maintain near-neutral reaction conditions, and ammonium stabilizing compounds, until the methylene, urea, and ammonia moeities are substantially converted to a water soluble polymethylene ureas solution containing minor amounts of methylolurea, methylene diurea and free ammonia.

2. The method of claim 1 wherein the buffering agents used in the first stage reaction are selected from the group consisting of sodium bicarbonate, potassium bicarbonate, sodium formate, potassium formate, potassium acetate, and sodium acetate.

3. The method of claim 1 wherein the near-neutral conditions maintained in the first stage reaction provide reaction solution pHs between 6.9 and 8.5.

4. The method of claim 1 wherein the buffering agents in the first stage reaction amount to between 0.003 and 0.03 mols buffering agent per mol of formaldehyde.

5. The method of claim 1 wherein the ammonium compounds used in the first stage reaction are selected from the group consisting of ammonium bicarbonate, ammonium carbonate, ammonium hydroxide, ammonium formate, ammonium acetate, and ammonia.

6. The method of claim 1 wherein the ammonium compounds used in the first stage reaction amount to between 0.03 and 0.10 mol ammonium compound per mol of formaldehyde.

7. The method of claim 1 wherein the first stage reaction substantial conversion of the formaldehyde to methylene moeities is continued until methylolurea moeities amount to between 0 and 10 percent of the formaldehyde.

8. The method of claim 1 wherein the urea added in the second stage reaction is sufficient to provide a molar excess of urea to formaldehyde amounting to between 1.0 and 1.7 mols of urea per mol of formaldehyde.

9. The method of claim 1 wherein the second stage reaction near-boiling temperatures are between 75° and 105° C.

10. The method of claim 1 wherein the second stage buffering agents are selected from the group consisting of sodium bicarbonate, potassium bicarbonate, sodium formate, potassium formate, sodium acetate and potassium acetate.

11. The method of claim 1 wherein the near-neutral reaction conditions maintained in the second stage reaction provide reaction solution pHs between 6.9 and 8.5.

12. The method of claim 1 wherein the buffering agents in the second stage reaction amount to between 0.03 and 0.30 mols buffering agent per mol of formaldehyde.

13. The method of claim 1 wherein all of the required buffering agents are provided in the first stage reaction to maintain near-neutral reaction conditions in both the first and second stage reactions.

14. The method of claim 1 wherein the ammonium compounds used in the second stage reaction are selected from the group consisting of ammonium bicarbonate, ammonium carbonate, ammonium hydroxide, ammonium formate, ammonium acetate, and ammonia.

15. The method of claim 1 wherein the ammonium compounds used in the second stage reaction amount to between 0.20 to 0.35 mol ammonium compound per mol of formaldehyde.

16. The method of claim 1 wherein the added urea and ammonia are reacted in the second stage reaction with the methylene moeities to substantially form water soluble polymethylene ureas containing between 0.0 to 0.04 mol methylolurea per mol of formaldehyde.

17. The storage stable, controlled release, polymethylene urea nitrogen fertilizer solution composition prepared by the method of claim 1.

18. A two stage method for preparing storage stable, controlled release polymethylene urea nitrogen fertilizer solution, comprising:
(a) a first stage reaction of between 1.93 and 2.10 mols formaldehyde with 1 mol urea, at a temperature between 80° and 90° C., in the presence of between 0.003 and 0.006 mols of buffering agent sodium bicarbonate and between 0.05 and 0.08 mols of ammonium hydroxide per mol of formaldehyde, continued until between 60 and 80 percent of the formaldehyde is converted to methylene moeities and conversion to methylolurea amounts to between 2 and 6 percent, leaving between 0 and 10 percent of the formaldehyde as free formaldehyde.
(b) a second stage reaction of the methylene moeities, with urea, providing between 1.3 to 1.5 mols of urea per mol of formaldehyde, at a temperature between 85° and 95° C., in the presence of between 0.04 and 0.06 mols of buffering agent sodium bicarbonate and between 0.25 and 0.30 mol ammonium hydroxide per mol of formaldehyde, the reaction continuing until the methylene moeities substantially form soluble polymethylene ureas, containing between 0 and 0.02 mol methylolurea and between 0.03 and 0.10 mol methylene diurea per mol of formaldehyde.

19. The storage stable, controlled release, polymethylene urea nitrogen fertilizer solution composition prepared by the method of claim 18.

* * * * *